(12) United States Patent
Fielder

(10) Patent No.: US 7,843,099 B2
(45) Date of Patent: Nov. 30, 2010

(54) HOLLOW GENERATOR

(76) Inventor: William Sheridan Fielder, 1401 White Oak Cir., Ojai, CA (US) 93023

( * ) Notice: Subject to any disclaimer, the term of this patent is extended or adjusted under 35 U.S.C. 154(b) by 456 days.

(21) Appl. No.: 11/803,062

(22) Filed: May 11, 2007

(65) Prior Publication Data
US 2007/0216245 A1 Sep. 20, 2007

Related U.S. Application Data

(63) Continuation-in-part of application No. 11/410,387, filed on Apr. 24, 2006, now abandoned.

(60) Provisional application No. 60/674,952, filed on Apr. 25, 2005, provisional application No. 60/845,036, filed on Sep. 14, 2006.

(51) Int. Cl.
*H02K 9/12* (2006.01)
(52) U.S. Cl. ..................................... 310/102 R; 290/54
(58) Field of Classification Search ............. 310/102 R; 290/43, 54
See application file for complete search history.

(56) References Cited

U.S. PATENT DOCUMENTS

| | | | | |
|---|---|---|---|---|
| 2,652,505 A | * | 9/1953 | Matheisel | 310/67 R |
| 3,644,766 A | * | 2/1972 | Hughes | 310/165 |
| 4,720,640 A | | 1/1988 | Anderson et al. | |
| 5,418,446 A | * | 5/1995 | Hallidy | 322/28 |
| 6,648,589 B2 | | 11/2003 | Williams | |
| RE38,336 E | | 12/2003 | Williams | |
| 6,729,840 B2 | | 5/2004 | Williams | |
| 6,848,503 B2 | * | 2/2005 | Schultz et al. | 166/66.5 |
| 6,957,947 B2 | * | 10/2005 | Williams | 415/4.3 |
| 7,190,087 B2 | | 3/2007 | Williams | |

* cited by examiner

*Primary Examiner*—Dang D Le

(57) ABSTRACT

Lacking a physical axis of rotation, this all-in-one electric generator/turbine requires less kinetic energy, substantially fewer parts, and less space in the power plant than traditional designs. The turbine is embedded within the rotor, each sharing a common axis of rotation, thus eliminating the interconnecting shaft. Power plants will be able to install more generators in the same amount of space. The reduced weight of the turbine/generator permits the generator's rotors to operate at a greater number of revolutions per minute. Unique intake and exhaust pipes prevent passing fluids or gases from interfering with the spinning rotor. A directional cone further enhances the rotor's turbine's ability to transform kinetic energy into rotational energy. More generators operating at higher rates of rotation will significantly increase the electric power generated. Also disclosed is a means of converting low head dams and reservoirs into hydroelectric electric power plants.

15 Claims, 9 Drawing Sheets

Figure 1:
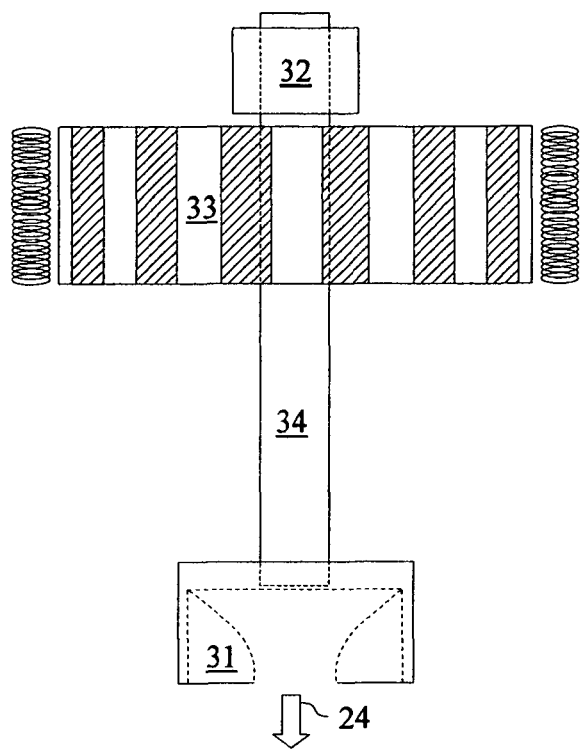

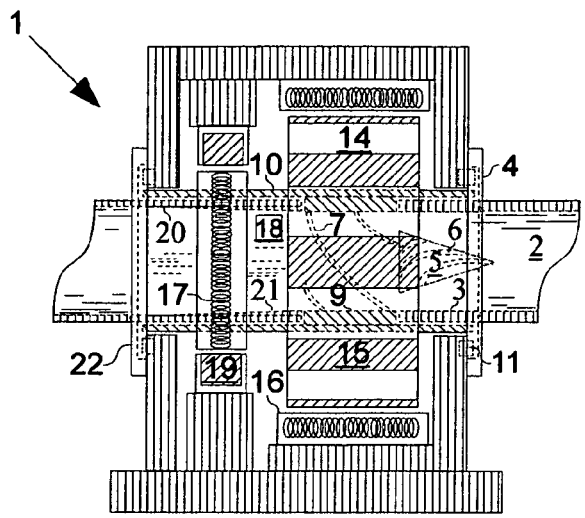
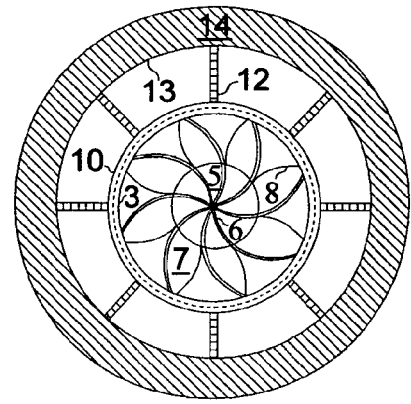
Fig. 4
Fig. 4a
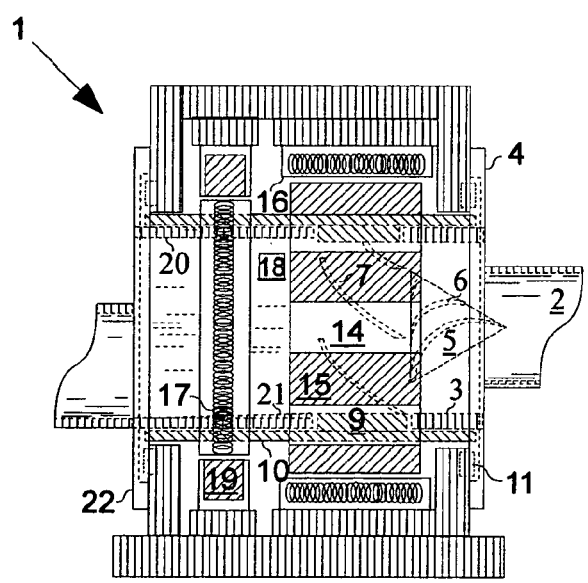
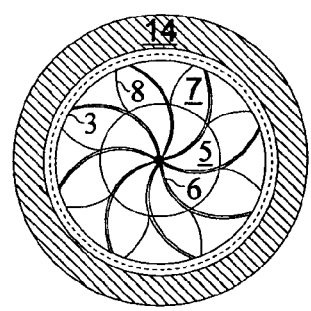
Fig. 5
Fig. 5a

HOLLOW GENERATOR

CROSS-REFERENCE TO RELATED APPLICATIONS:

This application is a continuation-in-part of application Ser. No. 11/410,387, filed Apr. 24, 2006 now abandoned by the present inventor, which is incorporated by reference and benefits from provisional patent application No. 60/674,952, filed Apr. 25, 20005.

This application claims benefit of provisional patent application No. 60/845,036, filed Sep. 14, 2006 by the present inventor, which is incorporated by reference.

This application uses the turbine and related technologies disclosed in my patent application Ser. No. 10/885,876, filed Jul. 6, 2004 by the present inventor, which is incorporated by reference.

FEDERALLY SPONSORED RESEARCH

None.

SEQUENCE LISTING

None.

BACKGROUND OF INVENTION

Prior Art

Typical hydroelectric power plant installations utilize Francis turbines (FIG. 1) that separate the turbine 31 from the exciter 32 and rotor 33 carrying the generator's magnets with an extended shaft 34. This introduces additional weight that reduces efficiency and requires significantly more space in the power house. The rotating weight of these turbine/generators is, on average, eight hundred tons.

Low head dams and reservoirs, on the other hand, incorporate Bulb turbine/generators (FIG. 2) that also separate the exciter 35, rotor 36, and gearbox 37 from the turbine blades 38 with an extended shaft 39, again introducing additional weight and complexity. This design limits the size of the rotor and thus the amount of electricity generated.

Figure 3:
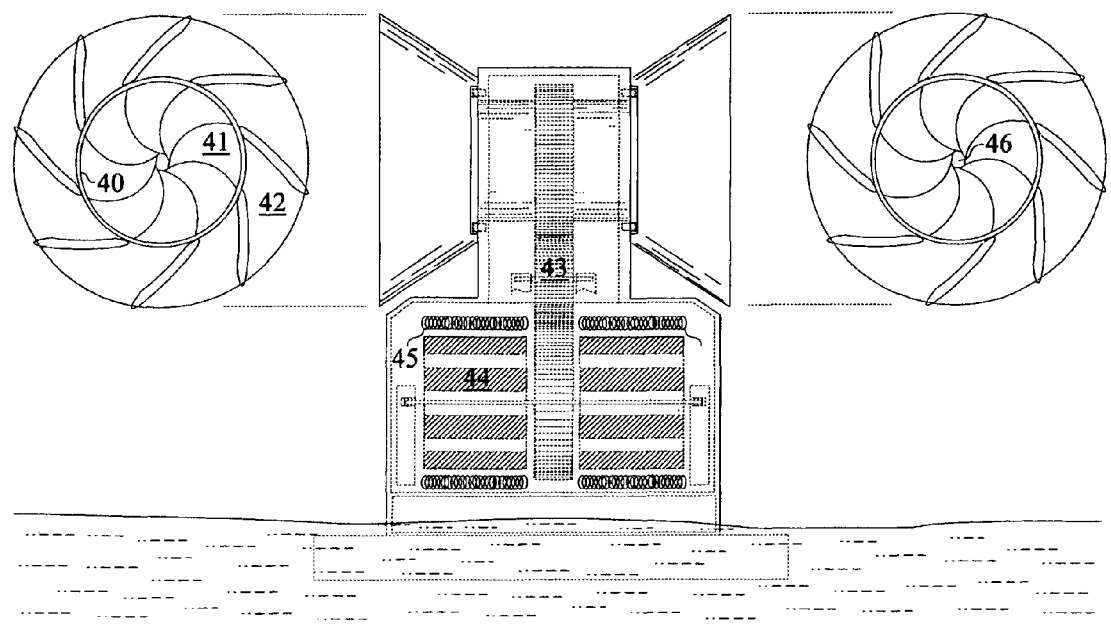

The referenced HOLLOW TURBINE, and similar designs, allow passing fluids to come into direct contact with the spinning turbine's inner cylinder wall 40. This adds unnecessary weight and drag on the rotating turbine 41. FIG. 3 depicts a tidal installation including: directional funnels 42, rotational energy connecting elements 43, two rotors 44 and two sets of stators 45. The vacant axis of rotation 46 allows fish and debris to safely pass through the turbine 41.

Other all-in-one hydroelectric turbine/generators such as Anderson et al. (U.S. Pat. No. 4,720,640), not shown, are built on a single shaft located at the rotor/turbine's axis of rotation. This design introduces complexity that results in high maintenance costs, as well as exposing critical apparatus to damage from passing debris. Fish mortality is high when passing fish get caught in between the spinning turbine blades and the stator's support structure.

SUMMARY

In accordance with one embodiment, an all-in-one generator/turbine has a cylinder with blades attached to its inner surface, an array of electromagnets mounted to the outside surface of said turbine cylinder, together with the exciters' induction coils. Bearings attached to the two open ends of said turbine cylinder connect the outer ends of the cylinder with its support structure.

The vacant axis of rotation allows passing fish and debris to safely exit the turbine without causing any harm to either the fish or the turbine. Incorporating the exciter onto the generator's rotor further saves space and complexity. Intake and exhaust pipes prevent the passing flow from adding weight and drag to the spinning HOLLOW TURBINE's cylinder. The rotor's diameter may be increased to maximize the power generated by the facility, with or without increasing the diameter of the matching turbine. A directional cone and its helical supports channel incoming flow in an optimal direction to the outermost and efficient portion of the turbine's blades.

In accordance with another embodiment, a siphon system, including an optional temporary pump, an upward sloping pipeline connecting to an optional air exhaust valve that connects to another downward sloping pipeline that connects to a hydroelectric generator and an optional water flow valve that enables existing dams and reservoirs, without existing hydroelectric power plants, to safely add such plants without compromising the structural integrity of the facilities.

Advantages

Accordingly, several advantages of one of more aspects are as follows: intake and exhaust pipes prevent entering and exiting fluids from interfering with the rotating turbine, thus increasing efficiency. A directional cone channels fluids or gases at an optimal angle to the rotor's turbine blades as well to the most efficient area of the blade's surface, further increasing efficiency. These improvements result in a generator/turbine that is more efficient, and requires less space and less maintenance to operate. Other advantages of one or more aspects will be apparent from a consideration of the drawings and ensuing description.

DRAWINGS—FIGURES

FIG. 1 PRIOR ART—Francis turbine with attached solid shaft and rotor.

Figure 2:
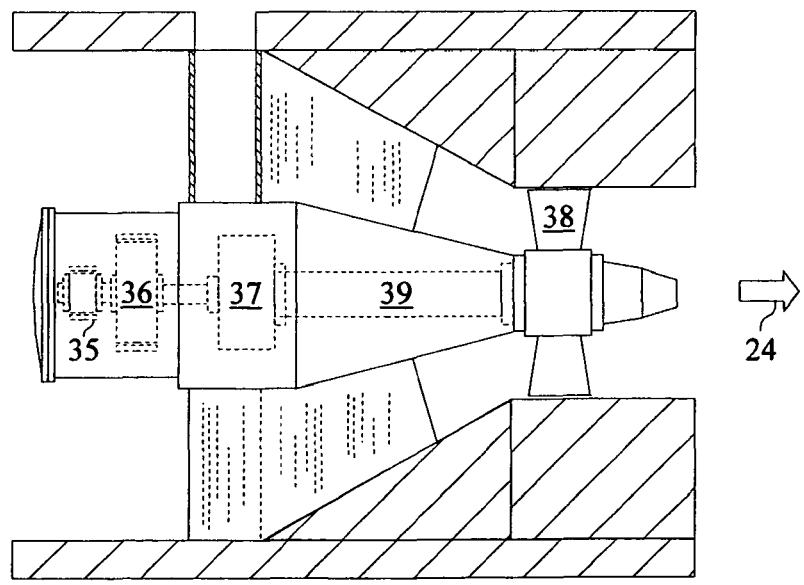

FIG. 2 PRIOR ART—Bulb turbine/generator.

FIG. 3 PRIOR ART—HOLLOW TURBINE within a tidal energy capture and electric generator installation.

FIG. 4 This is a cross-sectional view of a Hollow Generator with attached exciter, directional cone, and intake and exhaust pipes.

FIG. 4a An illustration of a front view of the Hollow Generator depicted in FIG. 4.

FIG. 5 This figure is the same as FIG. 4, a cross-sectional view of a Hollow Generator, except that the rotor attaches directly to the outer surface of the turbine, eliminating rotor supports.

FIG. 5a An illustration of the front view of FIG. 5.

Figure 6:
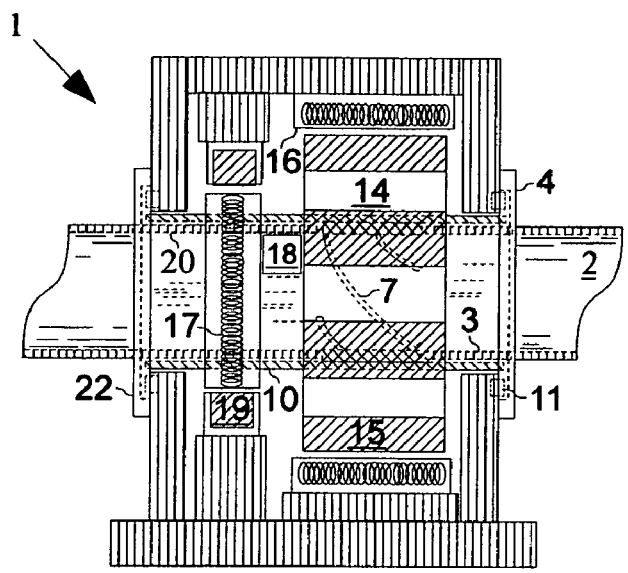

FIG. 6 This is the same as FIG. 4, a cross-sectional view of a Hollow Generator, without the cone and its supports.

Figure 6A:
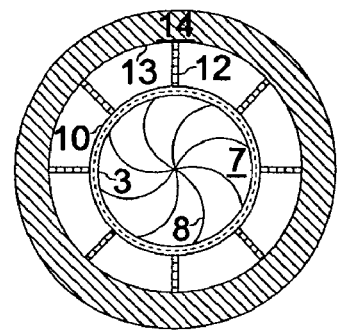

FIG. 6a An illustration of the front view of FIG. 6.

Figure 6B:
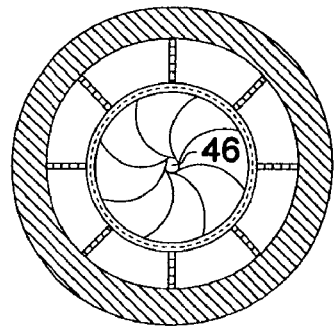

FIG. 6b Another illustration of the front view of FIG. 6 with a vacant axis of rotation, for fish and debris to safely pass through the generator.

Figure 7:
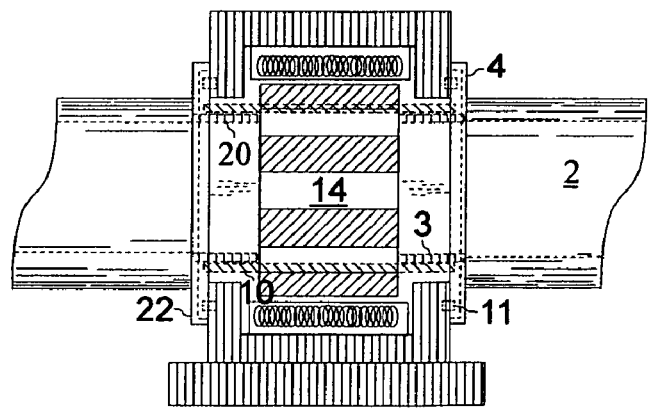

FIG. 7 This is the original Hollow Generator, including the newly introduced intake and exhaust pipes.

Figure 7A:
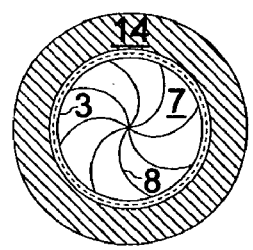

FIG. 7a A front view of FIG. 7.

Figure 8:
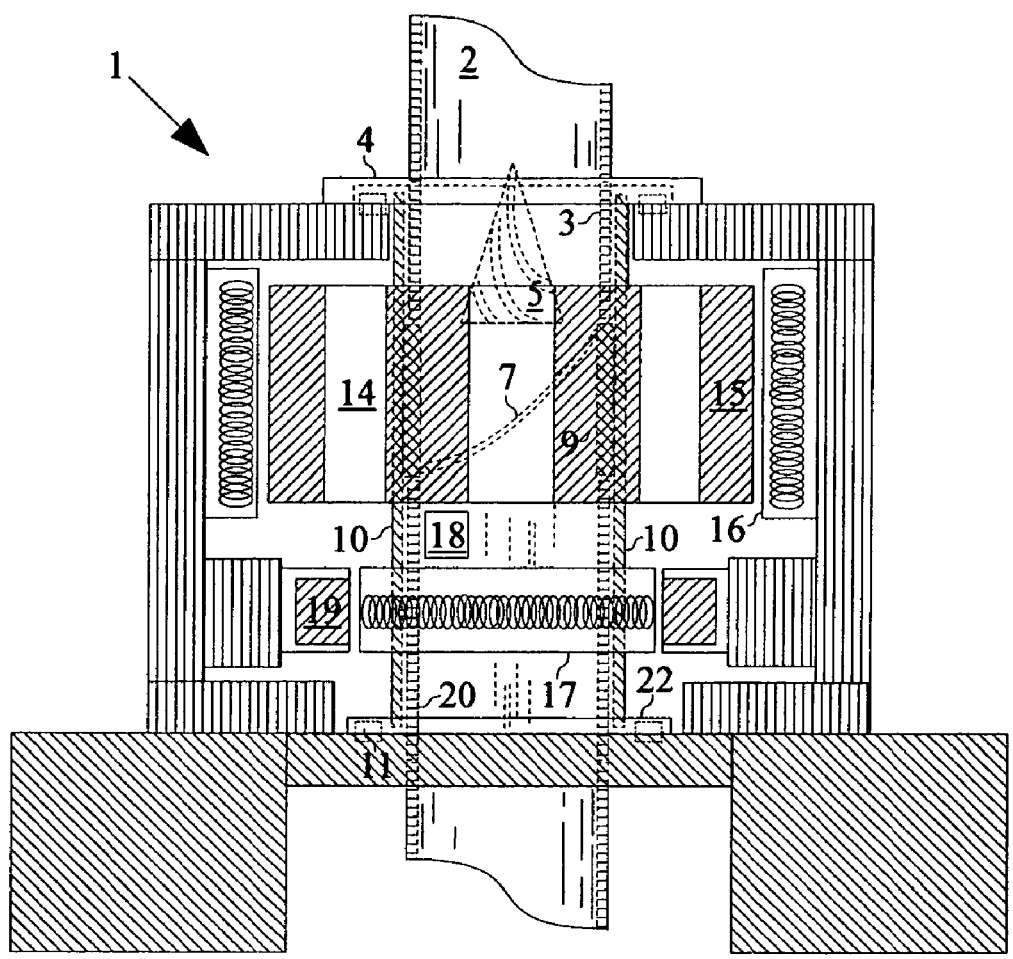

FIG. 8 A vertically mounted Hollow Generator with directional cone and intake and exhaust pipes.

Figure 9:
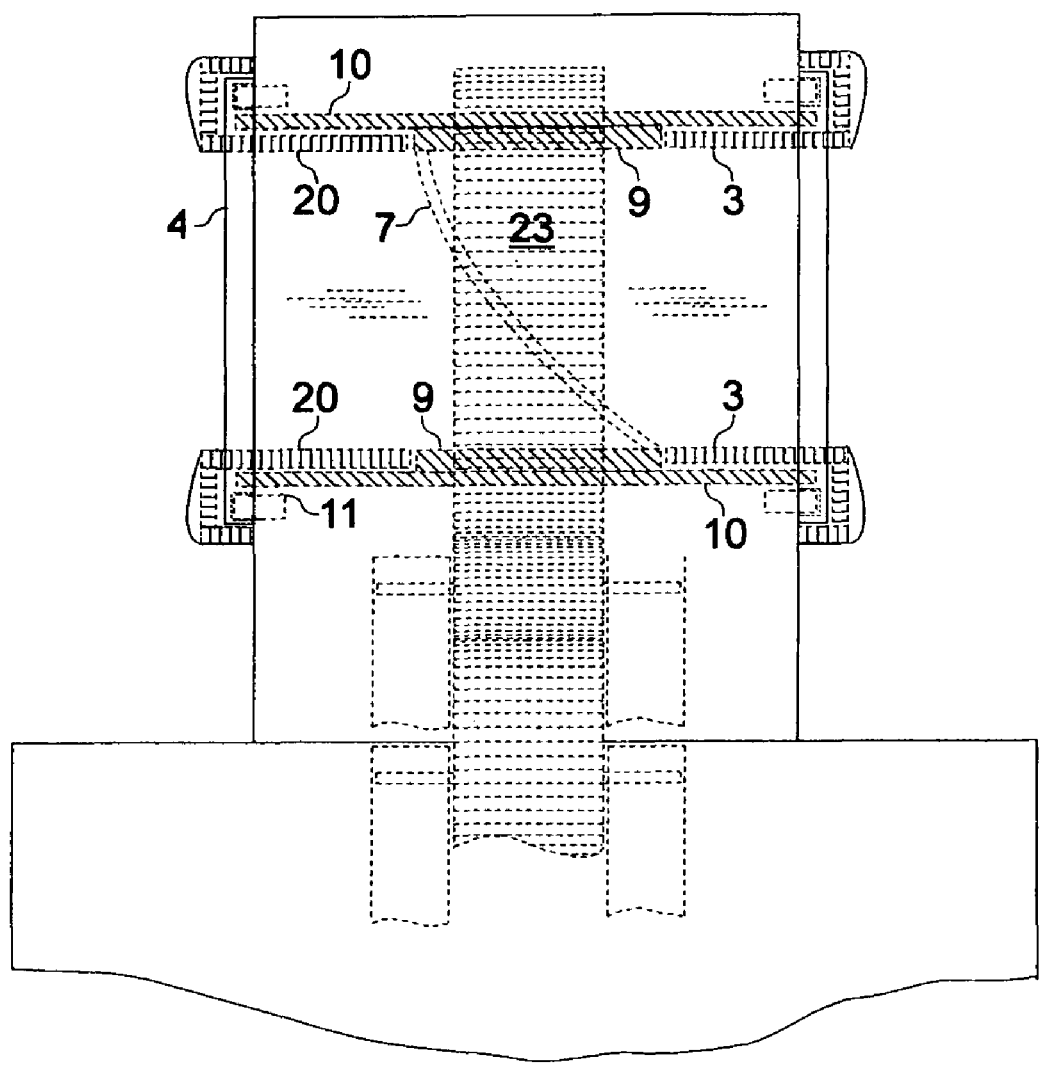

FIG. 9 A Hollow Turbine with intake and exhaust pipes attached to outer support structure.

Figure 10:
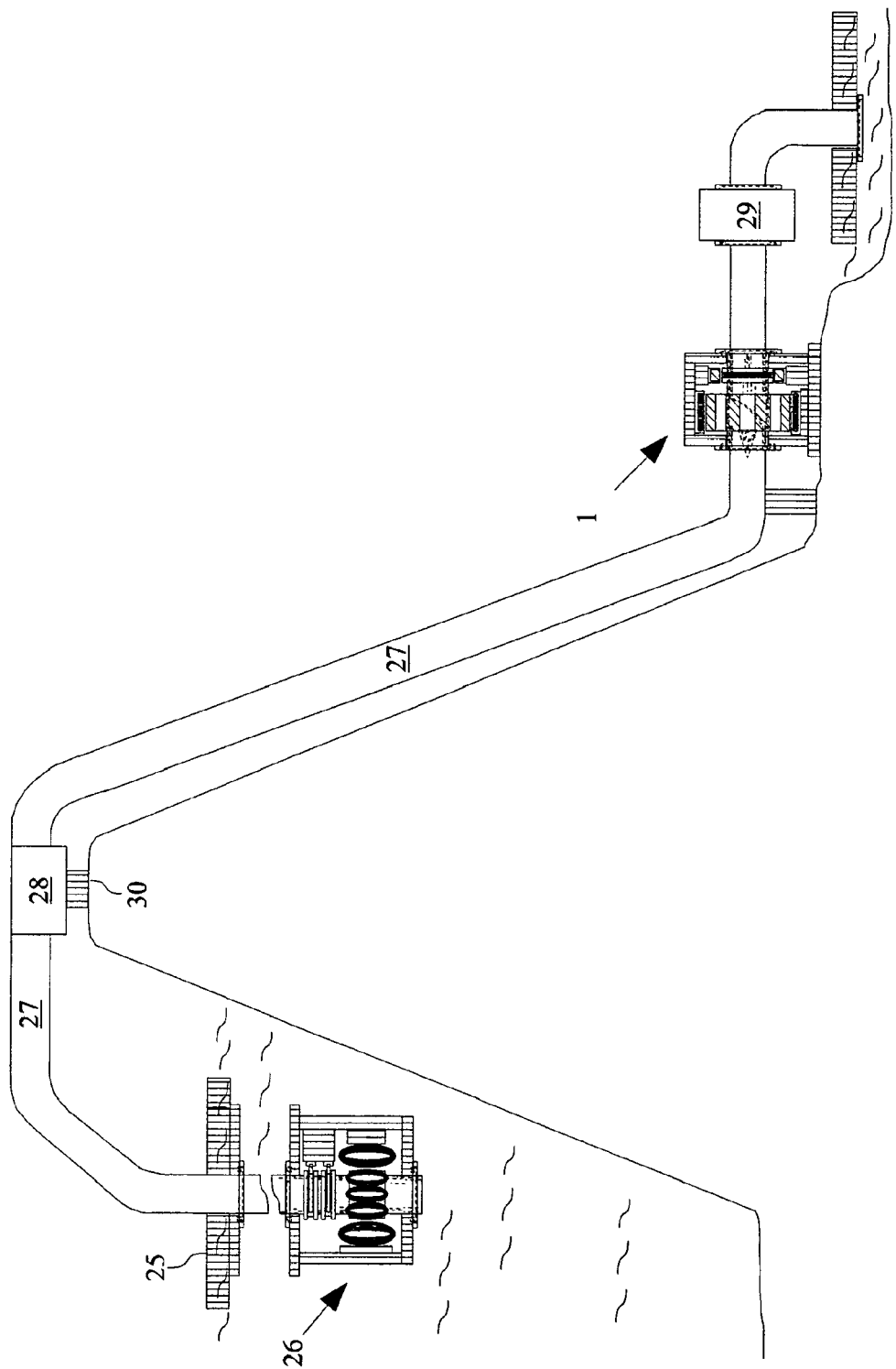
Figure 11:
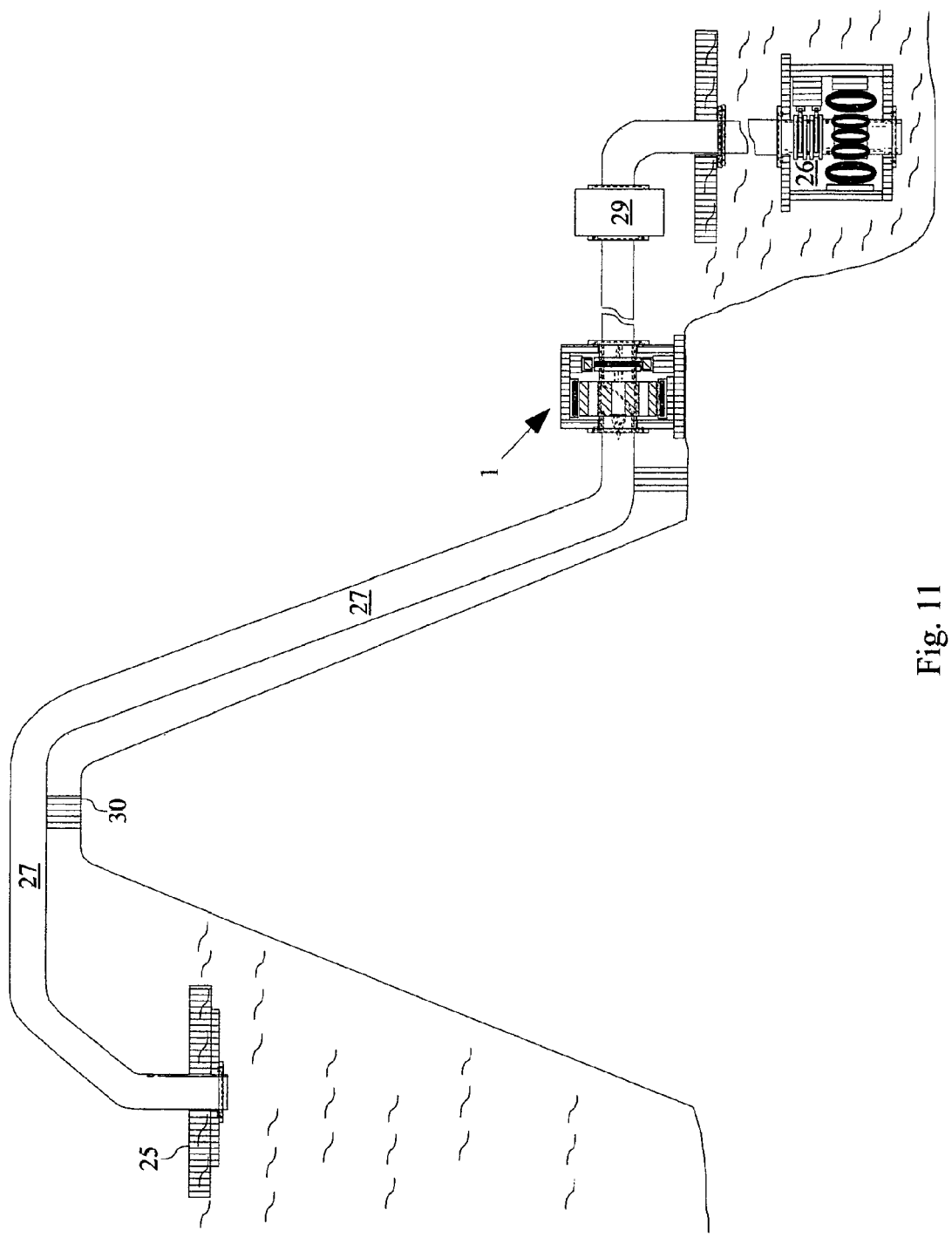
Figure 12:
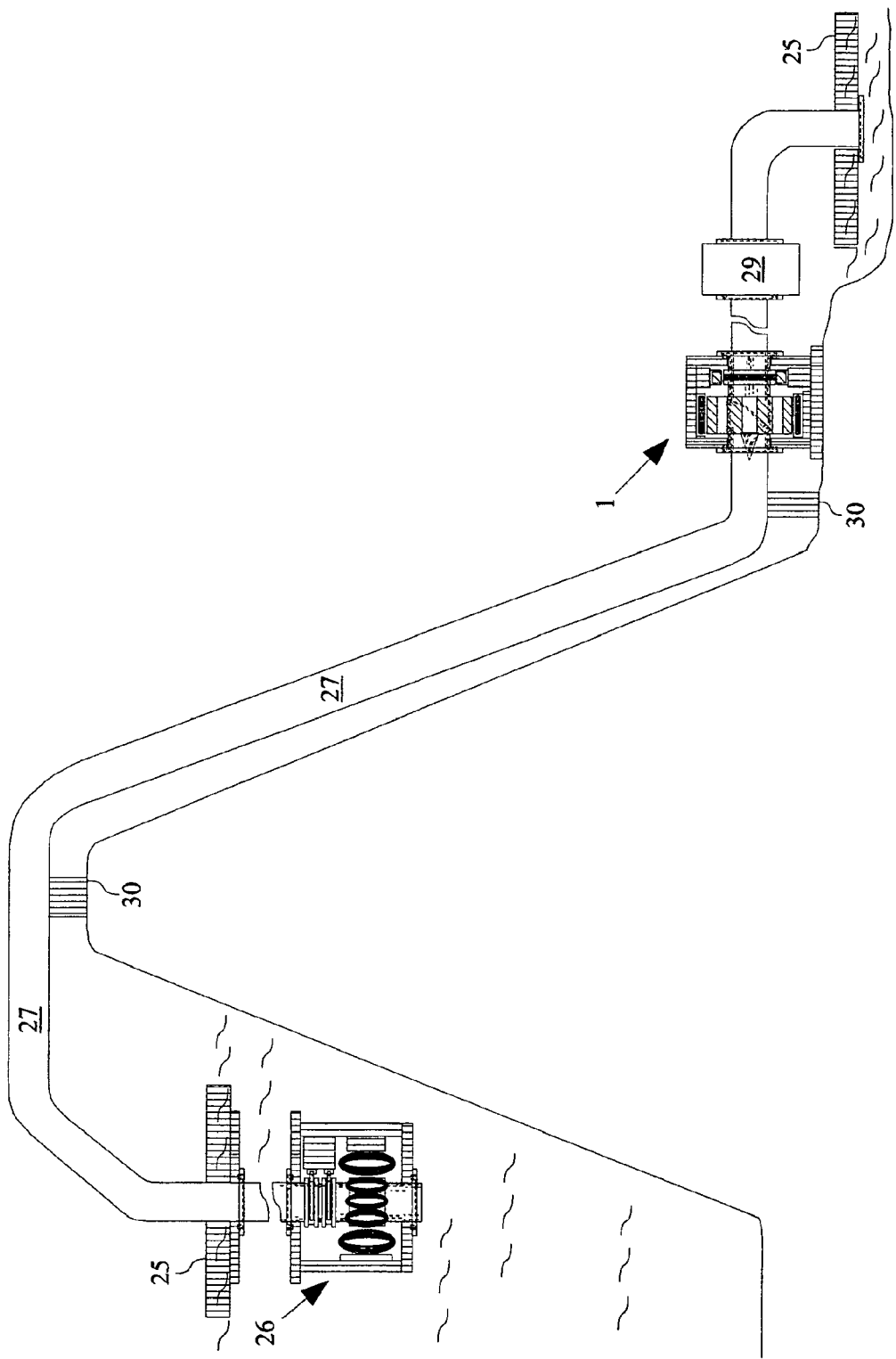

FIGS. 10, 11, & 12 Illustrations of a siphon and energy recapture system for dams, reservoirs, aqueducts and other pipeline applications.

DRAWINGS—REFERENCE NUMERALS

1. Hollow Generator
2. Flow source pipe
3. Intake pipe
4. Turbine shroud
5. Directional cone
6. Helical support
7. Turbine blades
8. Turbine blade's distal edge
9. Ring spacer in between the blades' base and the inner surface of the turbine's cylinder
10. Turbine cylinder
11. Turbine bearing
12. Rotor support (structural support)
13. Inner surface of rotor's cylinder
14. Rotor
15. Rotor magnets
16. Stator, wire coils
17. Exciter, rotor wire coils
18. Exciter, diode bridge (aka bridge rectifier)
19. Exciter, stationary magnets
20. Exhaust pipe
21. Tapered exhaust pipe
22. Turbine shroud
23. Rotational energy connecting element
24. Direction of flow
25. Floating platform with connecting pipeline
26. Temporary, mobile pump
27. Pipeline
28. Air exhaust valve
29. Water flow valve
30. Pipeline support structure
31. Francis turbine
32. Francis style exciter
33. Francis style rotor
34. Francis style shaft
35. Bulb turbine type exciter
36. Bulb turbine type rotor with adjacent stators
37. Bulb turbine type gearbox
38. Bulb turbine blades
39. Bulb turbine type shaft
40. Hollow Turbine cylinder inner surface
41. Hollow Turbine
42. Hollow Turbine, directional funnel
43. Hollow Turbine, rotational energy connecting elements
44. Hollow Turbine, rotor
45. Hollow Turbine, stator
46. Vacant axis of rotation, fish and debris exhaust hole.

DETAILED DESCRIPTION—FIRST EMBODIMENT—FIG. 4

This is a cross-sectional view of a HOLLOW GENERATOR 1 enclosure containing, a flow source pipe 2 fastened to the turbine shroud 4 that is connected to an intake pipe 3, that has an attached directional cone 5 suspended at the center by helical supports 6, directly adjacent to the turbine blades 7. The distal edges of said turbine blades 8 may, depending on their size, appear to form a single point (FIG. 6a) or an empty circle 46 (FIG. 3). The preceding connections are made with fasteners that include, but are not limited to bolts and nuts, or welds. Suspended by bearings 11, and covered by the turbine shroud 4, is the outer surface of the turbine 10 that is connected to the inner surface 13 of the rotor 14 by rotor supports 12, by nuts and bolts, welds, or other suitable fasteners. Stators 16 are mounted directly adjacent to the rotor 14. Also attached to the outer surface of the turbine 10, by nuts and bolts, welds, or other suitable fasteners, are the coils 17 of an electric conductor mounted on an insulator or the outer surface of the turbine 10 itself, and (the said coils) positioned so as to pass in close proximity to stationary magnets 19 that alternate in polarity around the turbine. Wires, not shown, electrically connect the coils 17 to a diode bridge 18 (a.k.a., bridge rectifier), that resides in close proximity to the exciter and connects electrically to the electromagnets 15 of the rotor 14. Connected to the turbine shroud 22 by nuts and bolts, welds, or other suitable fasteners, is an exhaust pipe 20 that extends into the turbine to a spot directly adjacent to the turbine blades 7. A ring spacer 9 is attached to the inner surface of the turbine cylinder 10 to elevate the base of the turbine blades 7 to the same height as the intake pipe 3 and the downward sloping, tapered exhaust pipe 21. Not shown is a drainage means to remove any water leaking from between the intake and exhaust pipes, and ring spacer. Such means include, but are not limited to, an array of drainage holes in the rotor 14 and a gutter, not shown.

The turbine's cylinder 10 and attached blades 7 may be fabricated from, but are not limited to, composite carbon fibers with an optional titanium veneer, or made entirely from stainless steel. The bearings 11 incorporated may be waterproof and include, but are not limited to: tapered roller bearings possibly made from ceramic, a combination thrust and cylindrical roller bearing, a hydrostatic bearing, and finally a magnetic bearing.

DETAILED DESCRIPTION—FIRST EMBODIMENT—FIG. 4a

This is a partial front view, enlarged for illustration purposes only, of the HOLLOW GENERATOR 1 illustrating the rotor supports 12 connecting the rotor 14 to the outer surface of the turbine 10. Also depicted are the directional cone 5 and attached helical supports 6 that connect to the inside of the intake pipe 3. In the background are the turbine blades 7 connected to the ring spacer 9 that attaches to the turbine cylinder 10. Fasteners for a means of attachment include, but are not limited to, nuts and bolts, or welds.

OPERATION—FIRST EMBODIMENT—FIGS. 4 and 4a

Water, entering via the flow source pipe 2 and over the intake pipe 3, comes into contact with the directional cone 5 and is channeled, by helical supports 6, in an optimal direction to the most efficient surface area of the turbine blades 7. The resulting force on the blades 7 rotates the turbine cylinder 10 and rotor 14. Electromagnets 15, on the rotor 14, are energized by the field current, generated in the rotating coils 17 that pass in close proximity to stationary magnets 19 that alternate in polarity. The generated field current is converted into direct current by the diode bridge 18 of the exciter. Electric conductors that transmit the electricity produced by the exciter coils 17 to the electromagnets 15 are not shown. Stators 16 are energized by the alternating magnetic fields produced by the rotor 14, with the resulting electricity transferred to transformers for distribution, not shown. Water exits the turbine via the downward sloping tapered exhaust pipe 21 and exhaust pipe 20. Thus, this embodiment provides the same function as other designs, but does so more efficiently by using a fewer number of lighter weight parts.

DETAILED DESCRIPTION—ADDITIONAL EMBODIMENT—FIG. 5

This embodiment is the same as FIG. 4 except that the rotor 14, attaches directly to the outer surface of the turbine 10, eliminating rotor supports 12.

This is a cross-sectional view of a HOLLOW GENERATOR 1 enclosure containing: a flow source pipe 2 fastened to the turbine shroud 4 that is connected to an intake pipe 3, that has an attached directional cone 5 suspended at the center by helical supports 6, directly adjacent to the turbine blades 7. The preceding connections are made by fasteners that may include, but are not limited to, bolts and nuts, or welds. Suspended by bearings 11 and covered by the turbine shroud 4 is the outer surface of the turbine 10, that is connected to the inner surface 13, as seen in FIG. 4a, of the rotor 14 by nuts and bolts, welds, or other suitable fasteners. Stators 16 are mounted directly adjacent to the rotor 14. Also attached to the outer surface of the turbine 10, by nuts and bolts, welds, or other suitable fasteners, are the coils 17 of an electric conductor mounted on an insulator, or the turbine itself, and (the said coils) positioned to pass in close proximity to the stationary magnets 19 that alternate in polarity around the turbine. Wires, not shown, connect the coils 17 to the electromagnets 15 of the rotor 14. Connected to the turbine shroud 22, by nuts and bolts, welds, or other suitable fasteners, is an exhaust pipe 20, that extends into the turbine to a spot directly adjacent to the turbine blades 7. The ring spacer 9 is attached to the inner surface of the turbine cylinder 10 to elevate the base of the turbine blades 7 to the same height as the intake pipe 3 and the downward sloping, tapered exhaust pipe 21.

DETAILED DESCRIPTION—ADDITIONAL EMBODIMENT—FIG. 5a

This embodiment is the same as FIG. 4a, except that the rotor 14 attaches directly to the outer surface of the turbine 10, eliminating rotor supports 12.

This is a partial front view of the HOLLOW GENERATOR 1, illustrating that the rotor 14 is connected directly to the outer surface of the turbine cylinder 10. Also depicted is a directional cone 5 and attached helical supports 6 that connect to the inside of the intake pipe 3. In the background are turbine blades 7 connected to the turbine cylinder 10 by a ring a spacer 9. Fasteners for the preceding means of attachment include, but are not limited to, nuts and bolts, or welds.

OPERATION—ADDITIONAL EMBODIMENT—FIGS. 5 and 5a

Water entering via the flow source pipe 2 and over the intake pipe 3 comes into contact with the directional cone 5, and is channeled by helical supports 6 in an optimal direction the most efficient surface area of the turbine blades 7. The resulting force on the blades 7 rotates the turbine cylinder 10 and attached rotor 14. Electromagnets 15, on the rotor 14, are energized by the current generated in the rotating coils 17 of the exciter, that pass in close proximity to stationary magnets 19. Electric conductors that transmit the electricity produced by the exciter coils 17 to electromagnets 15 are not shown. Stators 16 are energized by the alternating magnetic fields produced by the electromagnets 15 of the rotor 14; the resulting electricity is transferred to transformers for distribution, not shown. Water exits the turbine via the downward sloping exhaust pipe 21 and exhaust pipe 20.

DETAILED DESCRIPTION—ADDITIONAL EMBODIMENT—FIG. 6

This embodiment is the same as FIG. 4, except that there is neither a directional cone 5 nor its helical supports 6. Also absent from FIG. 4 is the tapered exhaust pipe 21.

This is a cross-sectional view of a HOLLOW GENERATOR 1 enclosure containing, a flow source pipe 2 fastened to the turbine shroud 4 that is connected to the intake pipe 3, positioned directly adjacent to the turbine blades 7. The preceding connections may include bolts and nuts, welds or other suitable fasteners. Suspended by bearings, and covered by the turbine shroud 4, is the outer surface of the turbine 10 that is connected to the inner surface 13 of the rotor 14 by rotor supports 12, by nuts and bolts, welds, or other suitable fasteners. Stators 16 are mounted directly adjacent to the rotor 14. Also attached to the outer surface of the turbine 10, by nuts and bolts, welds, or other suitable fasteners, are the coils 17 of an electric conductor mounted on an insulator, (the said coils) positioned to pass in close proximity to the stationary magnets 19 that alternate in polarity around the turbine. Wires, not shown, connect the coils 17 to the electromagnets 15 of the rotor 14. Connected to the turbine shroud 22, by nuts and bolts, welds or other suitable fasteners, is an exhaust pipe 20, extending into the turbine 10 to a spot directly adjacent to the turbine blades 7. A ring spacer 9 is attached to the inner surface of the turbine cylinder 10 to elevate the base of the turbine blades 7 to the same height as the intake pipe 3 and the exhaust pipe 20.

DETAILED DESCRIPTION—ADDITIONAL EMBODIMENT—FIG. 6a

This embodiment is the same as FIG. 4a, except that there is not a directional cone 5, or helical supports 6.

This is a front view of a HOLLOW GENERATOR 1, illustrating the rotor supports 12 connecting the rotor 14 to the outer surface of the turbine 10. Also depicted are the turbine blades 7 connected to the turbine cylinder 10 and intake pipe 3. Fasteners for the preceding means of attachment include, but are not limited to, nuts and bolts, or welds.

OPERATION—ADDITIONAL EMBODIMENT—FIGS. 6 and 6a

The operation of this embodiment is the same as FIG. 4 and FIG. 4a, except that there is neither a cone 5 nor supports 6 to channel water.

Water entering via the flow source pipe 2 and over the intake pipe 3 comes into contact with the turbine blades 7. The resulting force on the blades 7 rotates the turbine cylinder 10 and rotor 14. Electromagnets 15, on the rotor 14, are energized by the current generated in the rotating coils 17 that pass in close proximity to stationary magnets 19. Electric conductors that transmit the electricity produced by the exciter coils 17 to electromagnets 15 are not shown. Stators 16 are energized by the alternating magnetic fields produced by the electromagnets 15 of the rotor 14; the resulting electricity is transferred to transformers for distribution, not shown. Water exits the turbine via the exhaust pipe 20.

DETAILED DESCRIPTION—ADDITIONAL EMBODIMENT—FIG. 7

This embodiment is the original referenced HOLLOW GENERATOR and is the same as FIG. 4, except that there is neither a directional cone 5 nor its helical supports 6. Also absent from FIG. 4 is the tapered exhaust pipe 21, exciter 17 and 19, and the rotor supports 12.

OPERATION—ADDITIONAL EMBODIMENT—FIG. 7

Water entering via the flow source pipe 2 and over the intake pipe 3 comes into contact with the turbine blades 7. The resulting force on the blades, not shown, rotates the turbine cylinder 10 and rotor 14. After coming into contact with the turbine blades the water exits over the exhaust pipe 20.

DETAILED DESCRIPTION—ADDITIONAL EMBODIMENT—FIG. 8

This embodiment is the same as FIG. 4, except that the rotor 14/turbine cylinder 10, with attached blades 7, is mounted vertically and all bearings 11 face upward.

OPERATION—ADDITIONAL EMBODIMENT—FIG. 8

Operation is the same as described in the preferred embodiment described with FIGS. 4 and 4a.

DETAILED DESCRIPTION—ADDITIONAL EMBODIMENT—FIG. 9

This is an embodiment of the referenced original HOLLOW TURBINE with the newly introduced intake 3 and exhaust 20 pipes, together with the ring spacer 9.

OPERATION—ADDITIONAL EMBODIMENT—FIG. 9

Water enters the turbine cylinder 10 and comes into contact with the turbine blades 7 after passing over the intake pipe 3, and exits via the exhaust pipe 20. This causes the turbine cylinder with attached rotational energy connecting elements 23 to rotate.

DETAILED DESCRIPTION—ADDITIONAL EMBODIMENT—FIG. 10

This embodiment depicts a low head dam, reservoir or aqueduct application. A temporary pump 26, possibly mobile, attaches to an optional floating platform 25 and connects to the pipeline 27 that originates just below the floating platform 25 and is supported by a pipeline support structure 30. The pipeline 27 extends to an air exhaust valve 28 and generator 1. The water flow valve 29 and Hollow Generator 1 reside at an elevation lower than the floating platform 25.

OPERATION—ADDITIONAL EMBODIMENT—FIG. 10

The pump 26 is only necessary to fill the pipeline 27 with water while the air exhaust valve 28 is open and the water flow valve 29 is closed. As the pipeline 27 is filled, air is forced out of the air exhaust valve 28 until the pipeline 27 is completely filled with water. After filling with water, the air exhaust valve 28 is closed and the water flow valve 29 opens, forming a siphon, allowing water from behind the dam to flow freely against the generator's turbine blades. Thus, dams and reservoirs previously deemed unsuitable for generating hydroelectric power, due to low head, may be considered by incorporating the disclosed siphon and hydroelectric generator.

DETAILED DESCRIPTION—ADDITIONAL EMBODIMENT—FIGS. 11 & 12

This embodiment depicts a low head dam, reservoir or aqueduct application. A temporary pump 26, possibly mobile and located either upstream, FIG. 11, or downstream, FIG. 12, of the dam, attaches to an optional floating platform 25 and connects to the pipeline 27 that originates just below the floating platform 25 and below the waterline. The pipeline 27 extends to the HOLLOW GENERATOR 1. The water flow valve 29 resides at an elevation lower than the floating platform 25. Pipeline structural supports 30 and floating platforms 25 hold the pipeline 27 in place.

OPERATION—ADDITIONAL EMBODIMENT—FIGS. 11 & 12

The pump 26 is only necessary to fill the pipeline 27 with water. As the pipeline 27 is filled, air is forced out until the pipeline 27 is completely filled with water. After filling with water, the optional water flow valve 29 is closed, so that the pump may be removed, and then reopened, forming a siphon and allowing water from behind the dam to flow freely against the generator's turbine blades. Thus, dams and reservoirs previously deemed unsuitable for generating hydroelectric power, due to low head, may be considered by incorporating the previously disclosed siphon and hydroelectric generator.

CONCLUSION, RAMIFICATIONS, AND SCOPE

Therefore, the reader will see that according to the embodiments, I have provided an all-in-one electric generator/turbine that requires less kinetic energy to operate than conventional designs. Lower energy requirements will allow hydroelectric power plants to be constructed in areas previously deemed inadequate due to limited amounts of kinetic energy. Fewer moving parts result in greater efficiencies, require less space in the power plant, and reduce maintenance, due to fewer potential points of failure.

The embodiments are applicable to existing and traditional hydroelectric power plants, dams, reservoirs, standalone dam free installations in open waterways, and offshore hydroelectric plants.

While the above description contains many specificities, these should not be construed as limitations on the scope of the invention, but as exemplifications of the presently illustrated embodiments thereof. Other ramifications and variations are possible within the teachings of the invention. For example, pneumatic energy capture systems may also benefit from the invention. Also, permanent magnets may be utilized on the rotor, instead of electromagnets.

Thus the scope of the invention should be determined by the appended claims and their legal equivalents, and not by the examples given.

The invention claimed is:

1. An all-in-one turbine and electric generator comprising:
   a HOLLOW TURBINE comprising: at least one array of blades attached within a cylinder that is absent any center shaft and free to rotate;
   at least one array of magnets mounted on the outer surface of said HOLLOW TURBINE's said cylinder;

at least one stator comprising at least one stationary coil of an electric conductor;

a supporting structure;

an intake pipe whose outer diameter is less than the inner diameter of said cylinder, wherein said intake pipe is mounted inside said cylinder, whereby preventing incoming flow from making contact with the turbine until said flow comes into direct contact with said HOLLOW TURBINE's said at least one array of blades;

an exhaust pipe whose outer diameter is less than the inner diameter of said cylinder, wherein said exhaust pipe is mounted inside said cylinder, behind the turbine blades, whereby preventing the exiting flow from making contact with said cylinder;

whereby kinetic energy is captured and transformed into electricity efficiently in a compact fashion that allows fish and debris to safely pass over said at least one array of blades and through the turbine's vacant axis of rotation;

whereby the weight and drag of said flow does not degrade the efficiency of said HOLLOW TURBINE.

2. The all-in-one turbine and electric generator, as claimed in claim 1, wherein said intake pipe further includes a cone attached to the inside surface of said intake pipe by at least one support directly before said HOLLOW TURBINE's blades, whereby said support directs incoming flows in an optimal direction to said HOLLOW TURBINE's blades and to the outermost and efficient part of said HOLLOW TURBINE's blades, whereby providing greater leverage that results in more electricity being generated.

3. The all-in-one turbine and electric generator, as claimed in claim 2, wherein said at least one support is helical in shape, whereby incoming flows are channeled in a an optimal direction to the turbine's blades, whereby efficiency is significantly enhanced.

4. The all-in-one turbine and electric generator, as claimed in claim 1, wherein said HOLLOW TURBINE further includes at least one spacer to fit in between the inner surface of said cylinder and the base of the turbine blades, wherein the base of the blades is even in elevation to the inner surfaces of the intake and exhaust pipes.

5. The all-in-one turbine and electric generator, as claimed in claim 1, wherein said supporting structure further includes a means of allowing said HOLLOW TURBINE to rotate freely within close proximity to said at least one stator, wherein said means are bearings.

6. The all-in-one turbine and electric generator, as claimed in claim 1, wherein said at least one array of magnets are electromagnets.

7. The all-in-one turbine and electric generator, as claimed in claim 6, wherein said electromagnets further include an exciter.

8. The all-in-one turbine and electric generator, as claimed in claim 7, wherein said exciter comprises:

at least one coil of an electric conductor, inductor, mounted to said outer surface of said cylinder of said HOLLOW TURBINE or as claimed in claim 1, and electrically connected to said electromagnets;

at least one pair of stationary magnets positioned around said at least one coil of an electric conductor;

whereby providing field current to said electromagnets.

9. The all-in-one turbine and electric generator, as claimed in claim 7, wherein said exciter further includes at least one electrically connected diode bridge, i.e., bridge rectifier, between said at least one coil of an electric conductor and said electromagnets.

10. The all-in-one turbine and electric generator, as claimed in claim 6, wherein said electromagnets as claimed in claim 6, further include two electrically connected slide rings.

11. The all-in-one turbine and electric generator, as claimed in claim 10, wherein the two slide rings further include two brushes and two stationary contacts, connected to an electric power source.

12. The all-in-one turbine and electric generator, as claimed in claim 1, wherein said at least one array of magnets are permanent magnets.

13. The all-in-one turbine and electric generator, as claimed in claim 1, wherein said HOLLOW TURBINE, including said cylinder, is mounted vertically.

14. A method of generating electricity comprising:

providing a HOLLOW TURBINE comprising: at least one array of blades attached within a cylinder that is absent any center shaft and free to rotate;

providing at least one array of magnets mounted on the outer surface of said HOLLOW TURBINE's said cylinder;

providing at least one stator comprising at least one stationary coil of an electric conductor;

providing a supporting structure allowing a means for said at least one array of magnets to rotate in close proximity to said at least one stationary coil of an electric conductor;

providing an intake pipe whose outer diameter is less than the inner diameter of said cylinder, wherein said intake pipe is mounted inside said cylinder, whereby preventing incoming flow from making contact with the turbine until said flow comes into direct contact with said HOLLOW TURBINE's said at least one array of blades;

providing an exhaust pipe whose outer diameter is less than the inner diameter of said cylinder, wherein said exhaust pipe is mounted inside said cylinder, behind the turbine blades, whereby preventing the exiting flow from making contact with said cylinder;

whereby kinetic energy is captured and transformed into electricity efficiently in a compact fashion that allows fish and debris to safely pass over said at least one array of blades and through the turbine's vacant axis of rotation;

whereby the weight and drag of said flow does not degrade the efficiency of said HOLLOW TURBINE.

15. An all-in-one turbine and electric generator comprising:

a HOLLOW TURBINE comprising: at least one array of blades attached within a cylinder that is absent any center shaft and free to rotate;

at least one array of magnets mounted on the outer surface of said HOLLOW TURBINE's said cylinder;

at least one stator comprising at least one stationary coil of an electric conductor;

a supporting structure;

an intake pipe whose outer diameter is less than the inner diameter of said cylinder, wherein said intake pipe is mounted inside said cylinder, whereby preventing incoming flow from making contact with the turbine until said flow comes into direct contact with said HOLLOW TURBINE's said at least one array of blades;

an exhaust pipe whose outer diameter is less than the inner diameter of said cylinder, wherein said exhaust pipe is mounted inside said cylinder, behind the turbine blades, whereby preventing the exiting flow from making contact with said cylinder;

a cone attached to the inside surface of said intake pipe by at least one support directly before said HOLLOW TURBINE's blades, whereby said support and said cone direct incoming flows in an optimal direction to said HOLLOW TURBINE's blades and to the outermost and efficient part of said HOLLOW TURBINE's blades, whereby providing greater leverage that results in more electricity being generated.

whereby kinetic energy is captured and transformed into electricity efficiently in a compact fashion that allows fish and debris to safely pass over said at least one array of blades and through the turbine's vacant axis of rotation;

whereby the weight and drag of said flow does not degrade the efficiency of said HOLLOW TURBINE.

* * * * *

UNITED STATES PATENT AND TRADEMARK OFFICE
CERTIFICATE OF CORRECTION

PATENT NO.       : 7,843,099 B2                           Page 1 of 1
APPLICATION NO.  : 11/803062
DATED            : November 30, 2010
INVENTOR(S)      : William Sheridan Fielder It is certified that error appears in the above-identified patent and that said Letters Patent is hereby corrected as shown below:

Column 2, line 25, the word "of" should be changed to --or--; line 27, the word "fluids" should be changed to --flows--.

Column 5, line 58, the word --to-- should be inserted at the beginning of the line, reading "to the most efficient surface area of the turbine blades 7."

Column 8, line 47, the text --It is also applicable in power plants that utilize the kinetic energy in steam to power their rotors.-- should be inserted at the end of the paragraph, following the sentence reading "The embodiments are applicable to existing and traditional hydroelectric power plants, dams, reservoirs, standalone dam free installations in open waterways, and offshore hydroelectric plants."

Signed and Sealed this
First Day of March, 2011

David J. Kappos
*Director of the United States Patent and Trademark Office*